(12) United States Patent
Maruko et al.

(10) Patent No.: US 6,507,781 B2
(45) Date of Patent: Jan. 14, 2003

(54) PREVIEW BRAKE CONTROLLING APPARATUS AND METHOD FOR AUTOMOTIVE VEHICLE

(75) Inventors: Naoki Maruko, Kanagawa (JP); Minoru Tamura, Yokohama (JP); Hideaki Inoue, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/789,010

(22) Filed: Feb. 21, 2001

(65) Prior Publication Data

US 2001/0027367 A1 Oct. 4, 2001

(30) Foreign Application Priority Data

Feb. 21, 2000 (JP) .................................... 2000-043396

(51) Int. Cl.[7] .................................................. G06F 7/00
(52) U.S. Cl. .............................. 701/70; 701/78; 701/79; 303/121
(58) Field of Search .................. 701/70, 78, 79, 701/93, 95, 96, 83; 307/9.1; 303/121; 340/903

(56) References Cited

U.S. PATENT DOCUMENTS

| 5,752,214 | A | 5/1998 | Minowa et al. |
| 6,185,499 | B1 * | 2/2001 | Kinoshita et al. ............. 701/96 |
| 6,188,316 | B1 * | 2/2001 | Matsuno et al. ............ 340/441 |
| 6,415,230 | B1 | 7/2002 | Maruko et al. |

FOREIGN PATENT DOCUMENTS

| DE | 197 49 296 C1 | 7/1999 |
| DE | 198 17 326 A1 | 10/1999 |
| EP | 0 874 149 A2 | 10/1998 |
| EP | 197 34 567 A1 | 1/1999 |
| EP | 0 933 269 A1 | 8/1999 |
| EP | 1 010 596 A2 | 6/2000 |
| JP | 6-24302 | 2/1994 |
| JP | 7-144588 | 6/1995 |

* cited by examiner

*Primary Examiner*—Yonel Beaulieu
(74) *Attorney, Agent, or Firm*—Foley & Lardner

(57) ABSTRACT

In preview brake controlling apparatus and method for an automotive vehicle, a relative distance of the vehicle to an object for the vehicle to be braked is detected, a determination of whether the vehicle is approaching to the object on the basis of the relative distance of the vehicle to the object is made, a vehicular velocity variation rate (acceleration/deceleration) manipulation variable is made, the determination of whether the vehicle falls in a preliminary brake pressure application enabled state requiring a preliminary brake pressure application on the basis of results of detection at the steps of the approaching state detecting and of the vehicular velocity variation rate manipulation situation detection is made, and a predetermined constant brake pressure in accordance with a vehicular running condition prior to a vehicular driver's brake manipulation is developed when determining that the vehicle falls in the brake preliminary application enabled state.

19 Claims, 11 Drawing Sheets

FIG.9
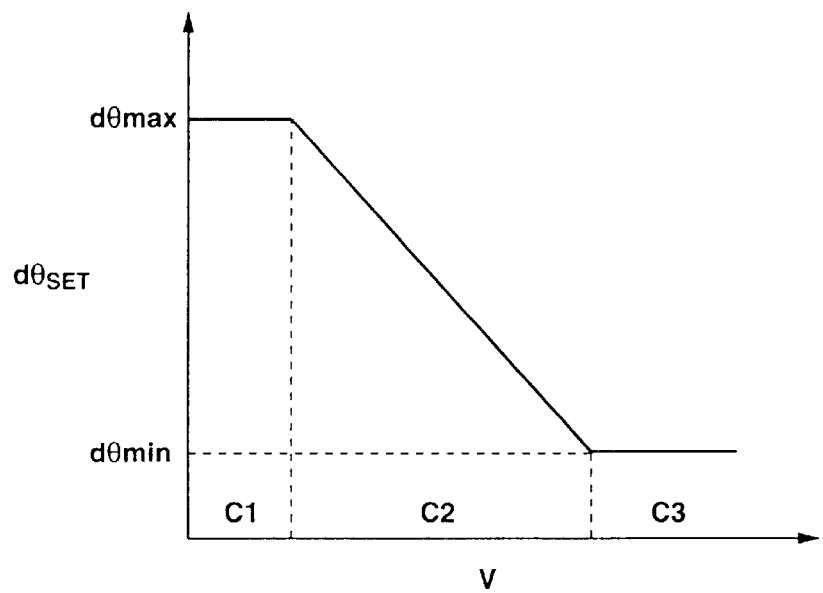
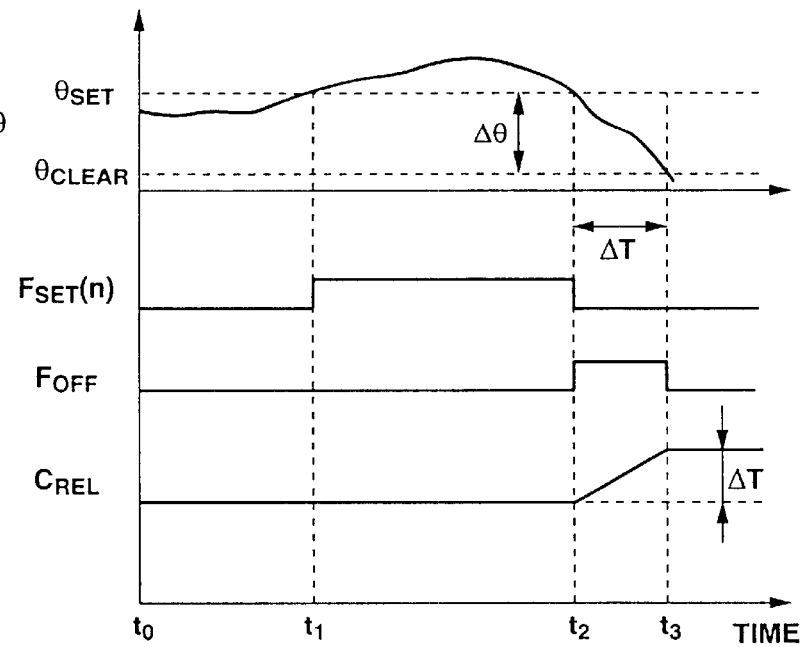
FIG.10A
FIG.10B
FIG.10C
FIG.10D

PREVIEW BRAKE CONTROLLING APPARATUS AND METHOD FOR AUTOMOTIVE VEHICLE

BACKGROUND OF THE INVENTION a) Field of the Invention

The present invention relates to preview brake controlling apparatus and method in which a brake pressure during an automatic control process is set in an automotive vehicle when a front obstacle to be braked is detected.

b) Description of the Related Art

A Japanese Patent Application First Publication No. Heisei 7-144588 published on Jun. 6, 1995 exemplifies a first previously proposed collision preventing apparatus for an automotive vehicle in which an automatic brake control is effected so that a collision between a front obstacle and the vehicle is previously prevented from occurring when a distance between the front obstacle and the vehicle does not satisfy a predetermined distance.

A Japanese Patent Application First Publication No. Heisei 6-24302 published on Feb. 1, 1994 exemplifies a second previously proposed automatic preliminary braking system in which a heel detector to detect a heel of a driver's foot which is rested on a heel rest is used to detect an accelerator manipulation information which is different according to different drivers and before the brake manipulation a preliminary brake pressure is applied.

SUMMARY OF THE INVENTION

In each of the first and second previously proposed collision preventing and automatic preliminary brake pressure apparatuses, a lower brake pressure of the automatic (preliminary) brake in a state where the vehicle is approaching to the obstacle gives an effect on a shortage in a free running distance or on an improvement in a responsive characteristic when the driver depresses a brake pedal. However, there is a possibility that the automatic brake control is effected in a case where depending upon an accuracy of an inter-vehicle distance sensor, an object other than the front obstacle on the same traffic lane is and a frequency of manipulating depressions-and-releases on an accelerator pedal. is high. In this case, a deceleration developed due to the effect of the automatic brake control often gives the driver an unpleasant (or uncomfortable) feeling.

On the contrary, it is considered that the set automatic (preliminary) brake pressure may be set to be lower. However, the actually developed vehicular deceleration may be larger than a target value thereof due to a control accuracy of a brake liquid pressure control actuator, a vehicular weight, or a variation in a frictional coefficient of the road surface on which the vehicle is running.

In this case, the application of the automatic (preliminary) brake pressure often gives the driver unpleasant (or uncomfortable) feeling.

It is, therefore, an object to provide preview brake controlling apparatus and method which can provide a preview brake control without giving a vehicular driver unpleasant feeling by activating a preliminary brake pressure during an automatic control process even if a vehicular deceleration equal to or higher than a target value thereof occurs.

According to one aspect of the present invention, there is provided with a preview brake controlling apparatus for an automotive vehicle, comprising: an object detector to detect a relative distance of the vehicle to an object for the vehicle to be braked; an approaching state detector to detect whether the vehicle is approaching to the object on the basis of the relative distance of the vehicle to the object; a vehicular velocity variation rate manipulation situation detector to detect a manipulation situation on a vehicular velocity variation rate; a preliminary brake pressure application start determining section that determines whether the vehicle falls in a preliminary brake pressure application enabled state requiring a preliminary brake pressure application on the basis of detection results by the approaching state detector and by the vehicular velocity variation rate manipulation situation detector; and a brake pressure generator to develop a predetermined minute brake pressure in accordance with a vehicular running condition prior to a vehicular driver's brake manipulation when the preliminary brake pressure application start determining section determines that the vehicle falls in the preliminary brake pressure application enabled state.

According to another aspect of the present invention, there is provided with a preview brake controlling method for an automotive vehicle, comprising: detecting a relative distance of the vehicle to an object for the vehicle to be braked; detecting whether the vehicle is approaching to the object on the basis of the relative distance of the vehicle to the object; detecting a vehicular velocity variation rate manipulation situation; determining whether the vehicle falls in a preliminary brake pressure application enabled state requiring a preliminary brake pressure application on the basis of detection results at the steps of the approaching state detecting and of the vehicular velocity variation rate manipulation situation; and developing a predetermined constant brake pressure in accordance with a vehicular running condition prior to a vehicular driver's brake manipulation when determining that the vehicle falls in the brake preliminary application state.

This summary of the invention does not necessarily describe all necessary features so that the invention may also be a sub-combination of these described features.

BRIEF DESCRIPTION OF THE DRAWINGS

FIG. 9 is a characteristic graph representing a vehicular velocity and a threshold value at which an accelerator releasing speed is determined.

FIGS. 10A, 10B, 10C, and 10D are integrally a timing chart for explaining an operation of the preview brake controlling apparatus in the first preferred embodiment.

DETAILED DESCRIPTION OF THE PREFERRED EMBODIMENTS

Reference will hereinafter be made to the drawings in order to facilitate a better understanding of the present invention.

(First Embodiment)

Figure 1A:
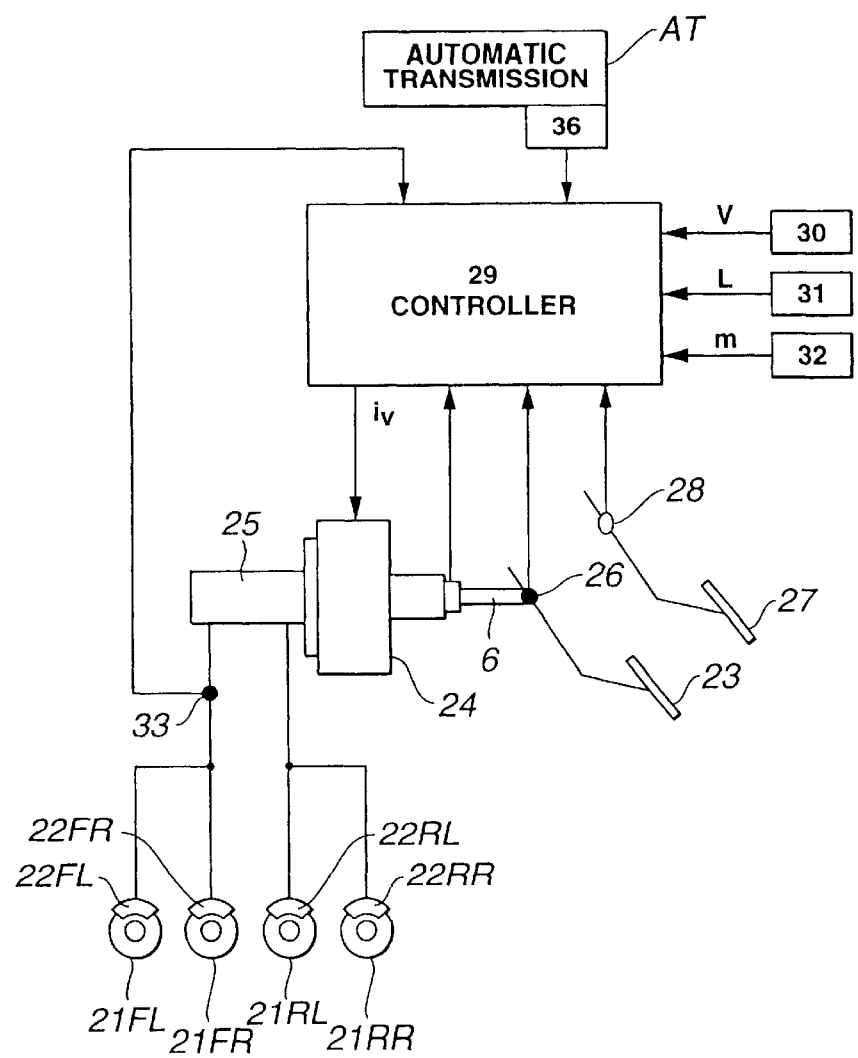
FIG. 1A is a system configuration view representing a first preferred embodiment of the preview brake controlling apparatus for an automotive vehicle.

FIG. 1A shows a system configuration view representing a first preferred embodiment of a preview brake controlling apparatus according to the present invention.

In FIG. 1A, reference numerals 21FL and 21FR denote front left and right road wheels of the vehicle and 21RL and 21RR denote rear left and right road wheels of the vehicle.

Each brake actuator 22FL through 22RR is constituted by developing a braking force in accordance with a braking pressure to be supplied.

Each brake actuator 22FL through 22RR is linked to a master cylinder 25 via an electronic vacuum pressure booster 24.

Figure 2:
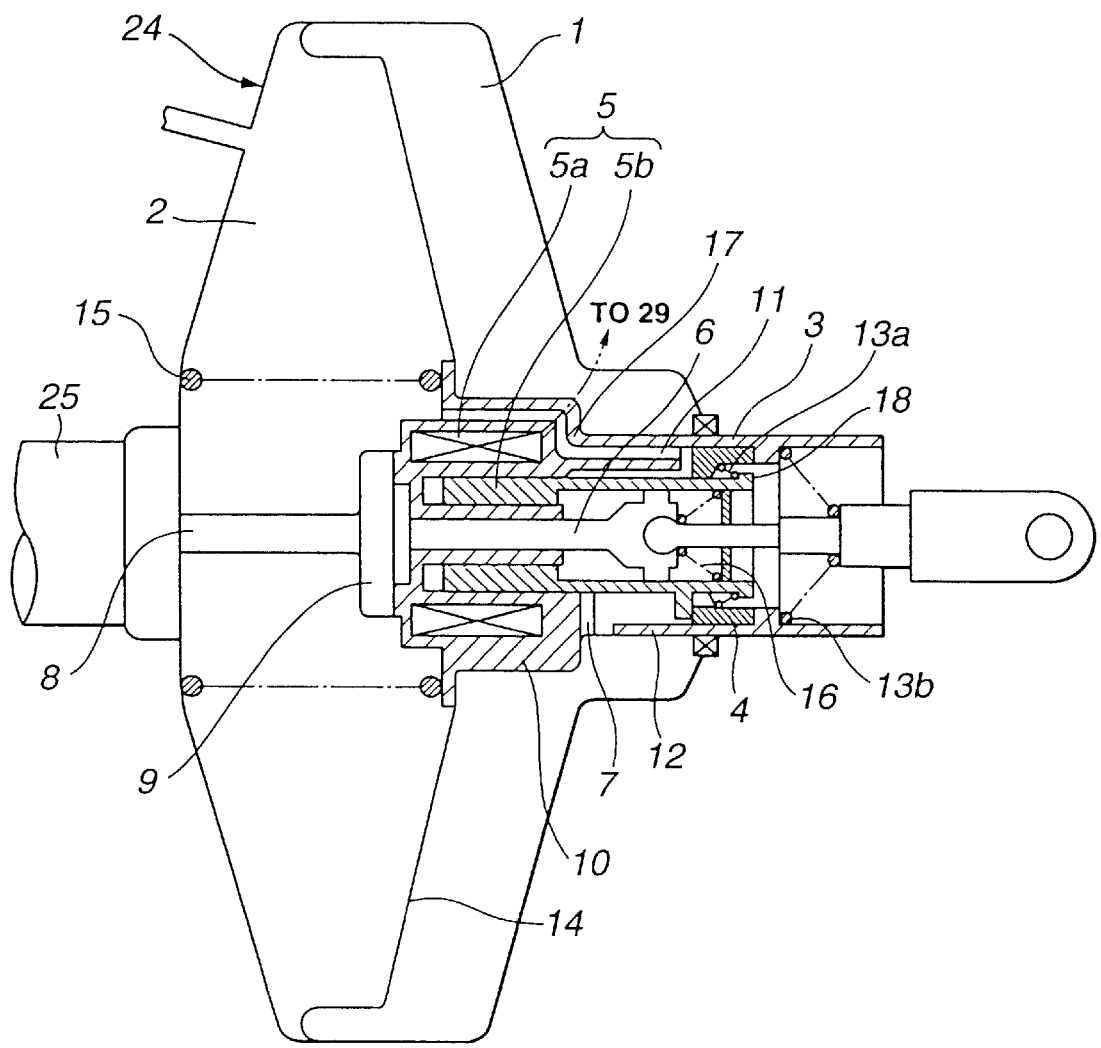
FIG. 2 is a cross sectional view of an electronic vacuum pressure booster to which the preview brake controlling apparatus in the first embodiment shown in FIG. 1A is applicable.

The electronic vacuum pressure booster 24 is constituted by FIG. 2. That is to say, a diaphragm 14 is defined with a pressure variation chamber 1 and a vacuum pressure chamber 2. The pressure variation chamber 1 provides a vacuum pressure state determined according to an engine vacuum pressure when the brake is not effected so that a pressure balanced state occurs with respect to the vacuum pressure chamber 2. When the brake is operated, the atmospheric pressure is introduced so that a pressure difference to the vacuum pressure chamber 2 occurs. A multiplied weight is transmitted to the master cylinder 25. The vacuum pressure chamber 2 is always maintained at a vacuum pressure during an engine start.

An axial envelope 17 is fixed on a center part of the diaphragm 14. A communication passage 11 to communicate between the vacuum pressure chamber 2 and the pressure variation chamber 1 is formed. A vacuum valve 3 is disposed on a right end sided opening of the communication passage 11. The vacuum valve 3 is closed when the driver strokes the brake pedal 23 or an electromagnetic valve 5 is energized so that the communication between the vacuum pressure chamber 2 and pressure variation chamber 1 is interrupted.

In addition, an atmospheric valve 4 is interposed between the pressure variation chamber 1 and the air to cooperate with a valve body 12 formed on a slidable envelope 5b as will be described later so as to be open when the driver depresses a brake pedal 23 to be stroked or the electromagnetic valve 5 is energized, thus the air being introduced into the pressure variation chamber 1.

The electromagnetic valve 5 includes a solenoid 5a disposed in an inner periphery of the axial envelope 17 and the slidable envelope 5b opposed to the solenoid 5a. An engagement portion 18 is formed on a right end of the slidable envelope 5b.

The slidable envelope 5b is biased in the rightward direction by means of a return spring 15 disposed within the vacuum pressure chamber 2.

An operating rod 6 is disposed within an inside of the slidable envelope 5b and a tip thereof is linked to a master cylinder 25 via a push rod 8. Return springs 13a and 13b are disposed within an axial envelope 17, a vacuum valve 3, and the atmospheric pressure valve 4 and a return spring 16 is interposed between the operating rod 16 and the slidable rod 5b.

Referring back to FIG. 1A, the brake pedal 23 is attached onto the operating rod 6 of the electronic vacuum booster 24. A brake switch 26 to detect a depression of the driver on the brake pedal 23 is disposed therein.

On the other hand, an accelerator opening angle sensor 28 is disposed on an accelerator pedal 27 to detect a depression variable of the accelerator pedal 27.

Furthermore, a brake pressure sensor 33 is disposed on an output pipe of the master cylinder 25 to detect a brake pressure.

A controller 29 controls the electromagnetic valve 5 of the electronic vacuum booster 24.

The controller 29 inputs various detection signals, viz., a switch signal from the brake switch 26, an accelerator opening angle θ of the accelerator opening angle sensor 28, and brake pressure of the brake pressure sensor 33, a vehicular velocity signal V of the vehicular velocity sensor 30 to detect the vehicular velocity, the vehicular velocity sensor 30 including road wheel velocity sensors, an inter-vehicle distance L of an inter-vehicle distance sensor 31 constituted by a laser radar or a millimetric wave radar, and a shift position signal of a shift position sensor 36 to detect a range position of an automatic transmission AT selected by the driver.

Then, the controller 29 controls a braking force to control the electromagnetic valve 5 of the electronic vacuum booster 24 on the basis of inputted various sensor signals described above.

Figure 1B:
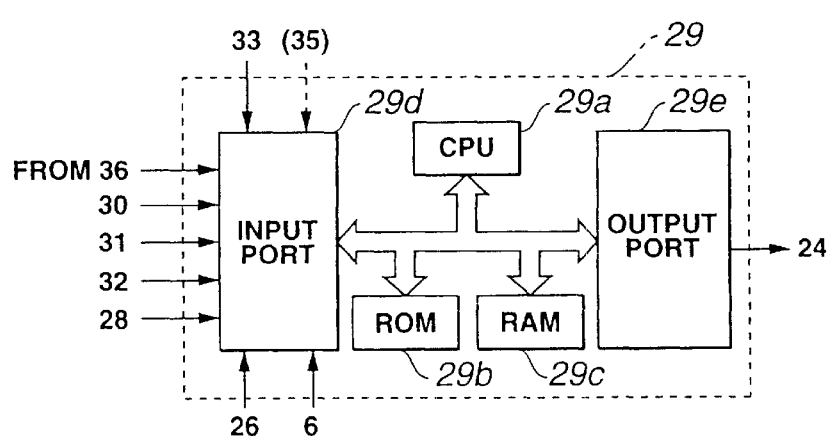
FIG. 1B is a circuit block diagram of a controller 29 shown in FIG. 1A.

FIG. 1B shows a general circuit block diagram of the controller 29.

As shown in FIG. 1B, the controller 29 includes a microcomputer having a CPU (Central Processing Unit) 29a, a ROM (Read Only Memory) 29b, a RAM (Random Access Memory) 29c, an Input Port 29d, and an Output Port 29e.

Figure 3:
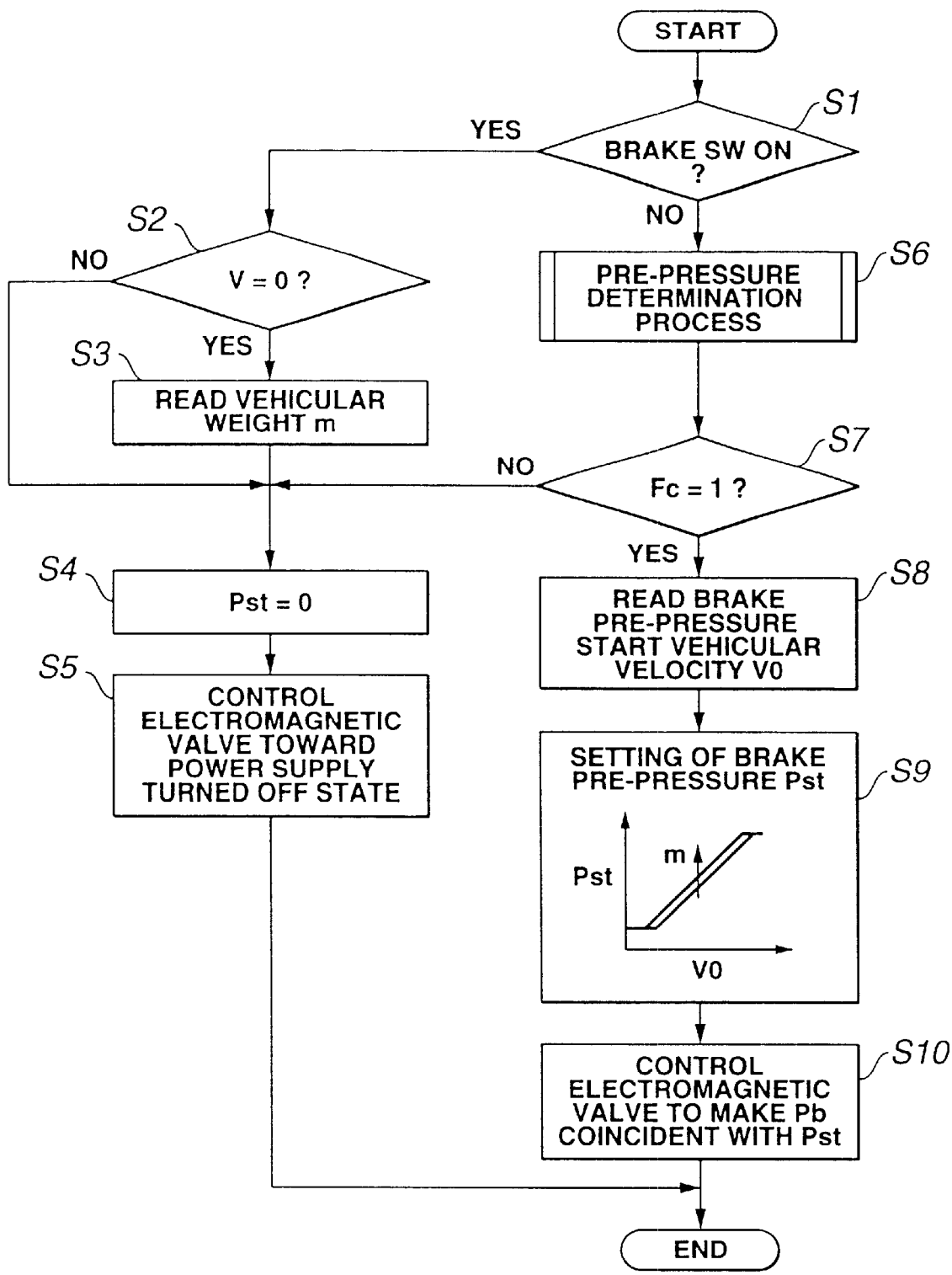
FIG. 3 is an operational flowchart representing a control procedure executed by the preview brake controlling apparatus shown in FIGS. 1A and 1B.

FIG. 3 shows an operational flowchart to be executed by the controller 29. The routine shown in FIG. 3 is executed as a timer interrupt routine for each predetermined period of time (for example, 10 milliseconds).

It is noted that each control flag and each variable shown in the flowchart shown in FIG. 3 are reset to zero in an initialization.

At a step S1, controller 29 reads the switch signal from the brake switch 26 and determines whether the switch signal indicates an ON state, viz., whether brake switch 26 is turned on so that the driver depresses brake pedal 23.

If the brake pedal 23 is depressed (Yes) at the step S1, the routine goes to a step S2.

At step S2, controller 29 reads vehicular velocity signal V from vehicular velocity sensor 30 to determine if vehicular velocity V is zero, viz., the vehicle has stopped. If V=0 (Yes) (namely, the vehicle stops) S2, the routine goes to a step S3. If V>0 (No) at step S2 (namely, the vehicle is running), the routine jumps to step S4.

At step S3, controller 29 reads a vehicular weight m detected by weight sensor 32 and the routine goes to a step S4.

At step S4, controller 29 sets a preliminary brake pressure Pst to zero and the routine goes to a step S5.

At step S5, controller 29 controls electromagnetic valve 5 to non-power supplied state so that the preliminary brake pressure Pst developed at the master cylinder 25 is zeroed. Then, the present timer interrupt routine is ended and is returned to a predetermined main routine.

Figure 5:
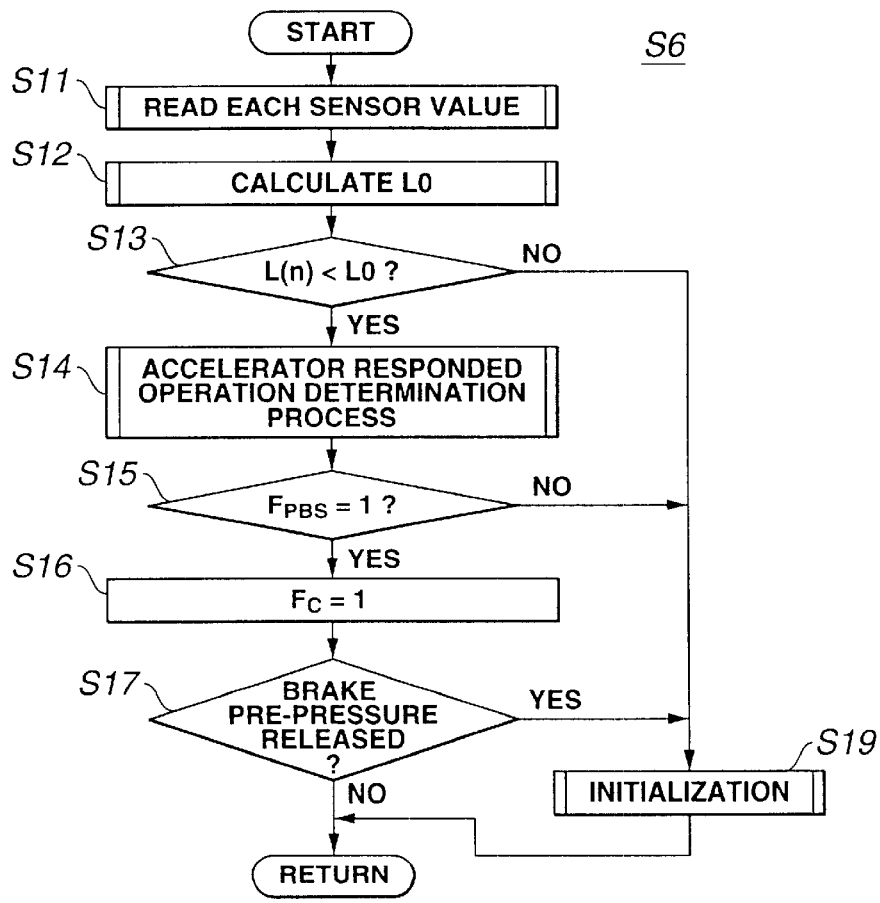
FIG. 5 is an operational flowchart representing a processing flowchart of a preliminary pressure determining procedure in a control procedure in FIG. 3.

On the other hand, if brake switch 26 is turned off, controller 29 determines that brake pedal 23 is released and routine goes to a step S6 to determine if it is necessary to develop the preliminary brake pressure, viz., to execute a preliminary brake pressure determining process (refer to FIG. 5).

Next, at a step S7, controller 29 determines if it is necessary to develop the preliminary brake pressure on the basis of a status of a control operation flag Fc determined in the preliminary pressure determining process at step S6.

If controller 29 determines that it is not necessary to develop the preliminary brake pressure since Fc=0 at step S7 (No), the routine jumps to step S4 described above.

If controller 29 determines that it is necessary to develop the preliminary brake pressure according to the status of the control operation flag (Fc=1) at step S7 (Yes), the routine goes to a step S8.

At step S8, controller 29 reads a preliminary brake pressure start vehicular velocity V0 which is the vehicular velocity at a time of start of the preliminary brake pressure. At step S9, controller 29 sets preliminary brake pressure Pst. This setting of preliminary brake pressure Pst is carried out by referring to a preliminary brake pressure calculation map shown in FIG. 4 on the basis of preliminary pressure start vehicular velocity V0 and vehicular weight m measured at the time of the vehicular stop at step S3.

Figure 4:
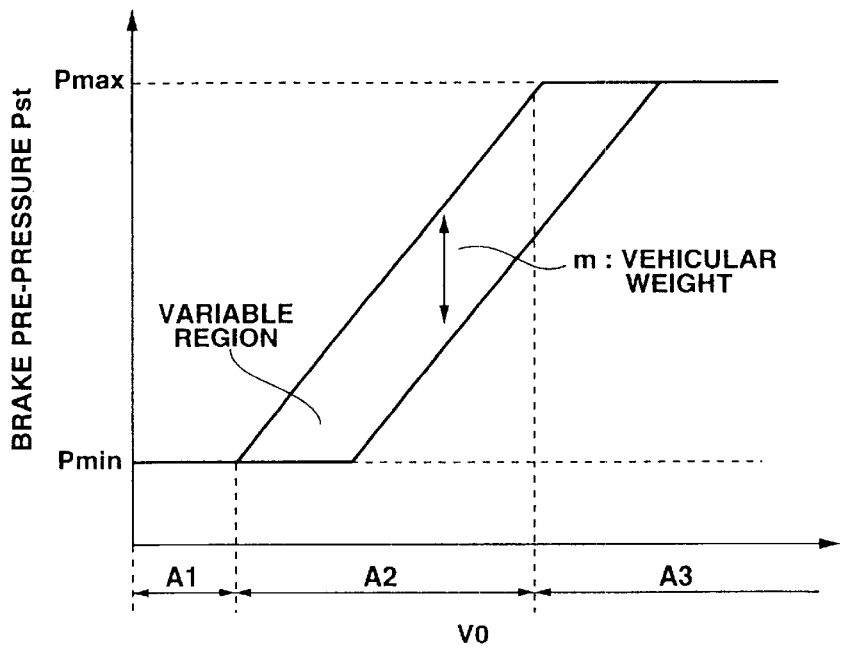
FIG. 4 is a characteristic graph representing a preliminary brake pressure calculation map.

FIG. 4 shows the preliminary brake pressure calculation map representing a relationship between vehicular velocity V and a set value of the preliminary brake pressure Pst during an automatic control.

As the vehicular velocity V0 becomes higher when it becomes necessary to develop the preliminary brake pressure, a vehicular deceleration that the driver feels is small although the brake pressure value is the same, As the vehicular velocity V0 described above is slow, this driver's feeling on the vehicular deceleration is relatively large. With these in mind, a characteristic curve is set such that a low vehicular velocity range A1 has a constant minimum value Pmin, a high vehicular velocity range A2 has a constant maximum value Pmax, and a linear interpolation between the minimum value Pmin and the maximum value Pmax is taken in a middle velocity range A2.

Furthermore, the setting pressure is corrected to be higher since a correction of the setting pressure is carried out in accordance with vehicular weight m and as vehicular weight is increased, the effect of brake pressure is small.

Next, at step S10, controller 29 reads brake pressure Pb detected by brake pressure sensor 33.

A power supply control is carried out by controller 29 for electromagnetic valve 5 so that the brake pressure Pb becomes coincident with preliminary brake pressure Pst and timer interrupt routine is ended and is returned to the predetermined main routine.

FIG. 5 shows a flowchart of a subroutine called at step S6 shown in FIG. 3.

As shown in FIG. 5, controller 29 reads the detection signal and the switch signal of each kind of sensors at step S11.

At a step S12, controller 29 calculates an approaching distance L0 to determine if the vehicle is approaching to an object to be braked such as a preceding vehicle running ahead of the vehicle at a slower velocity than the vehicle, a preceding vehicle stopped in front of the vehicle, or an obstacle on a front road surface in accordance with an equation (1).

It is noted that X in equation (1) denotes a deceleration (G). In addition, dV denotes a relative velocity of the vehicle to the object and is a differential value of the inter-vehicle distance (variation rate in the inter-vehicle distance) which is a deviation between present inter-vehicle distance L(n) and previously read inter-vehicle distance L(n−1) detected by inter-vehicle distance sensor 31 divided by the timer interrupt period T.

$$L0 = \{V^2 - (V-dV)^2\}/(2*X*9.8) \quad (1)$$

Next, at a step S13, controller 29 determines if the present inter-vehicle distance L(n) is smaller than the approaching distance L0. If L(n)≧L0 (No) at step S13, the routine goes to a step S19 since controller 29 determines that the vehicle is not approaching to the front object.

If L(n)<L0 (Yes) at step S19, the routine goes to step S14 since controller 29 determines that the vehicle is approaching the front object.

At step S14, controller 29 executes a subroutine of the operation determining process of the preliminary brake pressure on the basis of operation situation of the accelerator pedal.

This operation determining process sets the threshold value θSET to detect a development situation of acceleration from a depressed state of accelerator pedal 27.

Figure 6:
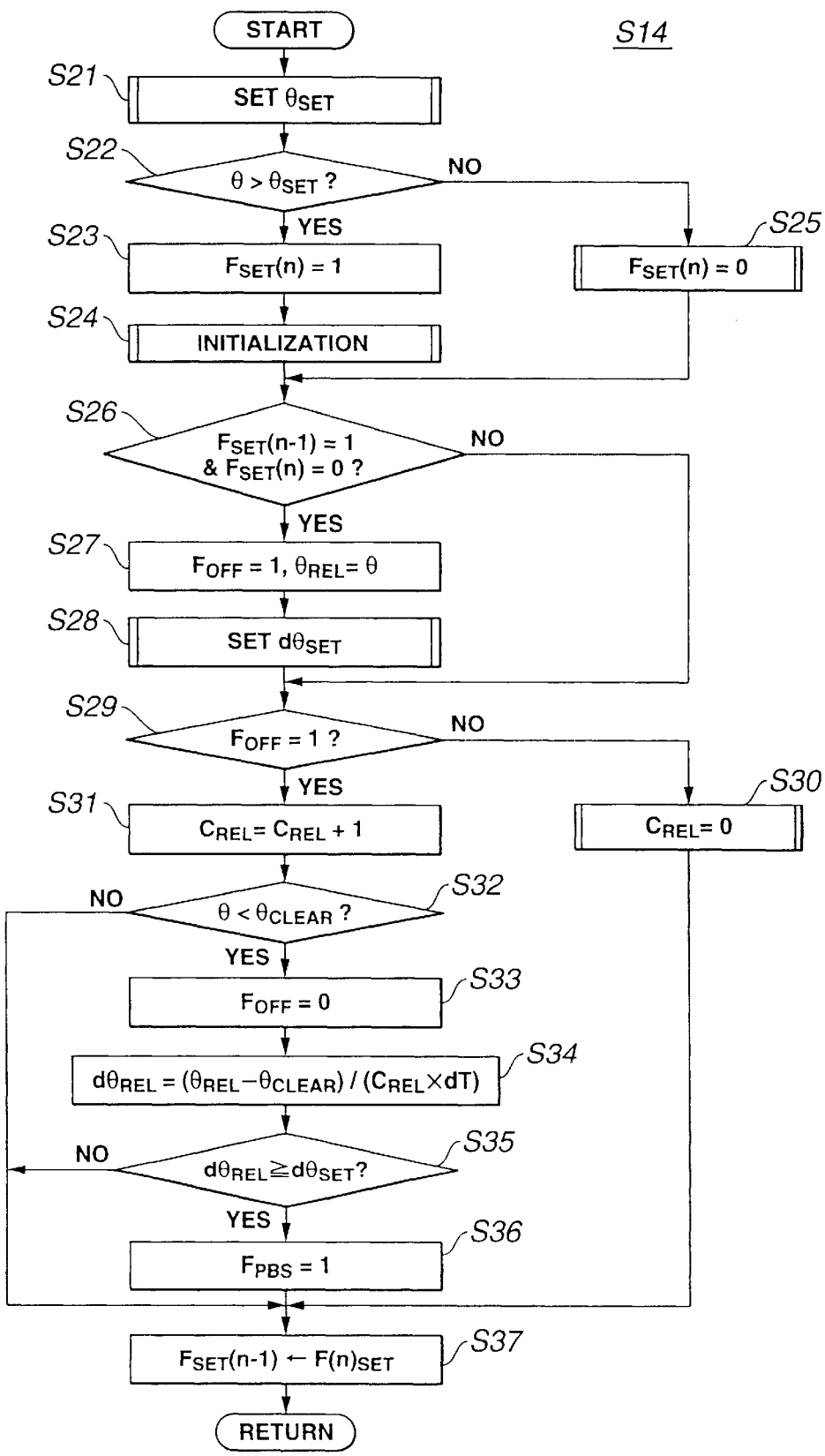
FIG. 6 is an operational flowchart representing one example of a subroutine in an operation determination process (step S14) shown in FIG. 5.

FIG. 6 shows the subroutine of preliminary brake pressure operation determining process at step S14 in FIG. 5.

In details, at a step S21, controller 29 sets a depression determination threshold value θSET to detect a development situation of a vehicular acceleration according to a depression state of the accelerator pedal 27. The setting of the depression determination threshold value θSET is carried out by referring to the depression determining threshold value calculation map shown in FIG. 7 on the basis of the vehicular velocity V from the vehicular velocity sensor 30 and the shift position signal from the shift position sensor 36.

Figure 7:
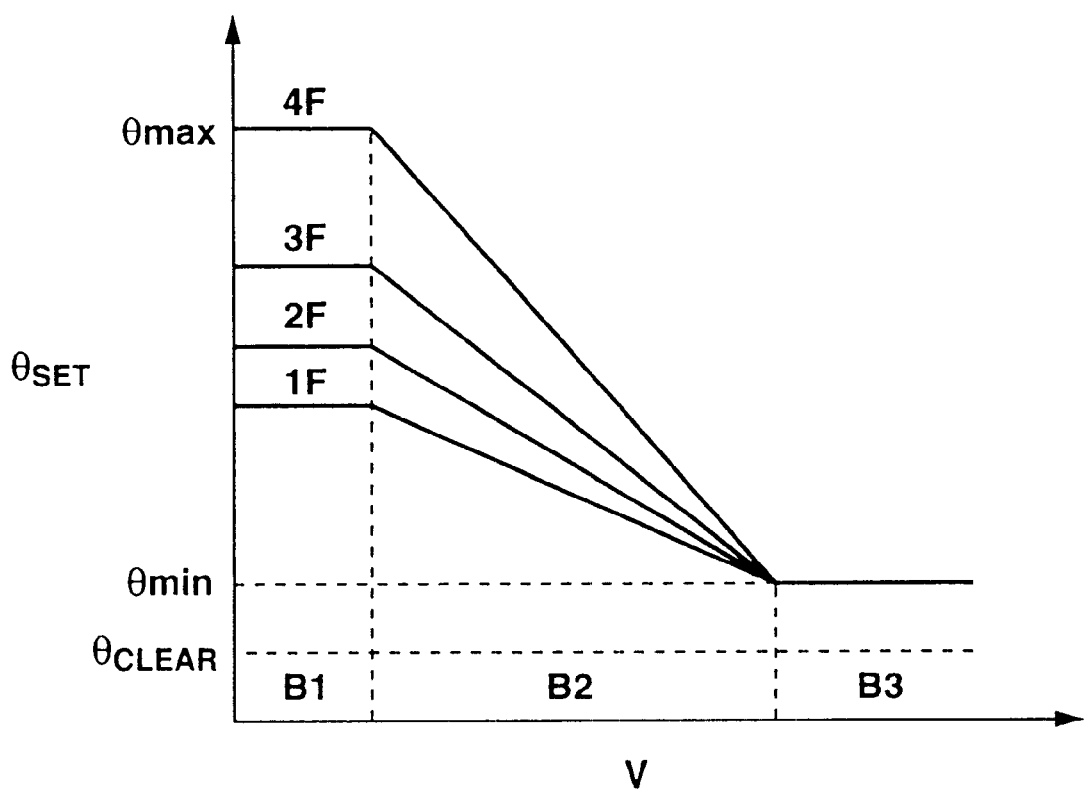
FIG. 7 is a characteristic graph of a calculation map of a threshold value of accelerator depression determination representing a relationship between a vehicular velocity and the threshold value of accelerator depression determination with a transmission shift position as a parameter.

The depression determining threshold value calculation. map is a representation of a relationship between the vehicular velocity V and the depression determination threshold value θSET, as shown in FIG. 7, with the shift position of automatic transmission AT as a parameter. The depression determining threshold value θSET is set to a value which enables to be deemed that neither a sudden braking feeling nor an unpleasant feeling is given to the driver even if the preliminary brake pressure is applied in a case where an engine braking is acted upon when the driver releases the accelerator pedal 27 from the deep depression state.

Figure 8A:
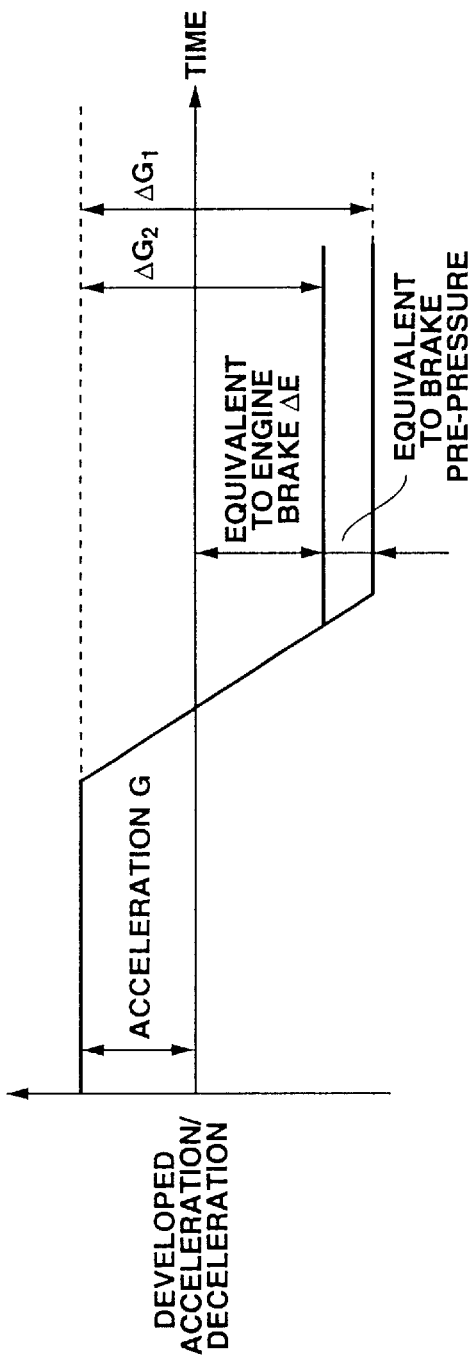
FIGS. 8A, 8B, and 8C are explanatory views for explaining a calculation map of the accelerator depression determination threshold value.
Figure 8C:
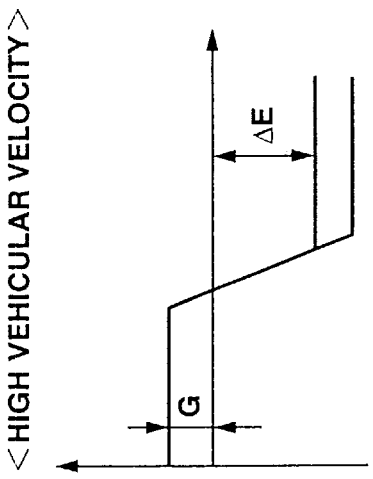

In a case of the sudden operation of the preliminary brake pressure during the run of the vehicle, a condition such that neither sudden brake operation feeling nor unpleasant feeling are given to the driver can include as shown in FIG. 8A.

In details, instantly when the driver returns the depressed accelerator pedal 27 to a substantially original position from a state in which the driver has depressed the accelerator pedal 27 to accelerate the vehicle or to cruise the vehicle at a constant velocity (cruise run), the engine brake is usually acted upon the vehicle. In this addition, if the preliminary brake pressure is acted upon the vehicle, a generated deceleration with the preliminary brake pressure is overlapped over the engine brake deceleration.

In this case, in order not to give the driver unpleasant feeling nor uncomfortable feeling, it is desirable to reduce a ratio of a difference, i.e., ΔG1/ΔG2 to be equal to or lower than a predetermined value Gd(ΔG1/ΔG2 Gα). The one difference ΔG1 is a difference between the acceleration at which the vehicle is running or the vehicle cruises and that at which both of the engine brake and the preliminary brake pressure are acted upon the vehicle, as shown in FIG. 8A. The other difference ΔG2 is a difference between the acceleration at which the vehicle is running or the vehicle cruises and that at which only the engine brake is acted upon the vehicle, as shown in FIG. 8A.

Figure 8B:
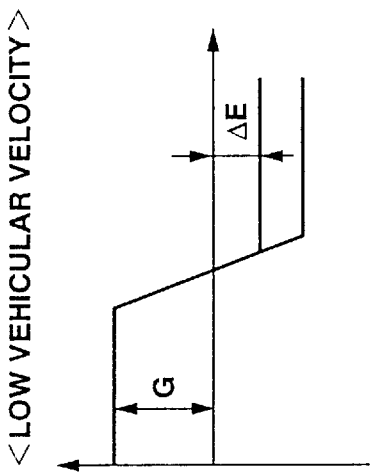

At this time, as shown in FIG. 8B, since the deceleration ΔE which can be achieved by means of the engine brake during the low velocity region is smaller than that which can be achieved thereby during the high velocity region, it is necessary to enlarge the acceleration G before the return of the accelerator pedal 27 to the original position as compared with the case of the high velocity region in order to reduce the ratio ΔG1/ΔG2 to be equal to or lower than the predetermined value of ΔGα. To achieve this, it is necessary to make a depression variable of the accelerator pedal 27 at the low velocity region larger than that at the high velocity region.

In addition, a magnitude of acceleration with respect to the depression variable of accelerator pedal 27 when the shift position of automatic transmission AT is higher, viz., a transmission gear ratio is smaller is smaller than that when the shift position of automatic transmission AT is lower, viz., the transmission gear ratio is larger.

Hence, as shown in FIG. 7, the characteristic curve is set to have the constant maximum value θmax at the low velocity region B1 which is equal to or lower than a city street running velocity (corresponds to about 40 Km/h), to have the constant minimum value θmin at the high velocity region B3 which is equal to or higher than a free-way running velocity (corresponds to about 80 Km/h), and to have a linear interpolation value between the maximum and minimum value θmax and θmin at a middle velocity region B2. Furthermore, since the magnitude of acceleration with respect to the depression variable of the accelerator pedal 27 becomes smaller as the gear shift position of automatic transmission AT becomes smaller (viz., the gear ratio of automatic transmission AT becomes smaller), the correction of the threshold value in the characteristic curve of FIG. 7 is carried out. in accordance with the shift position of automatic transmission AT. If a minimum gear ratio shift position is 1F and a maximum gear ratio shift position is 4F, the threshold value of θSET becomes higher as the shift position of automatic transmission AT becomes higher.

As described above, if the depression determining threshold value θSET is set at step S21, the routine shown in FIG. 6 goes to a step S22.

At step S22, controller 29 determines if the accelerator opening angle θ from accelerator opening angle sensor 28 is wider than the accelerator depression determining threshold value of θSET set at step S21.

If θ>θSET (Yes) at step S22, the routine goes to a step S23 in which a depression flag $F_{SET}(n)$ is set to $F_{SET}(n)=1$.

After an initialization at the next step S24, the routine goes to a step S26.

The initialization of step S24 is carried out in such a manner that an accelerator return start opening angle θREL is set to zero (θREL=0), a return counter $C_{REL}$ is set to zero ($C_{REL}$=0), a return flag $F_{OFF}$ is reset to zero ($F_{OFF}$=0), and an operation enable flag $F_{PBS}$ is reset to zero ($F_{PBS}$=0).

On the other hand, if, at step S22, θ≦θSET (No), the routine jumps to a step S25 in which the depression confirmation flag $F_{SET}(n)$ is set to 0 ($F_{SET}$=0). Then, the routine goes to step S26.

At step S26, controller 29 determines if a previously stored previous depression confirmation flag $F_{SET}(n-1)$ is 1($F_{SET}(n-1)$=1) and the present depression confirmation flag $F_{SET}(n)$ is 0 ($F_{SET}(n)$=0) (logical AND).

If $F_{SET}(n-1)$=1 and $F_{SET}(n)$=0 (Yes) at step S26, the routine goes to a step S27.

If $F_{SET}(n-1)$≠1 and $F_{SET}(n)$≠0 (No) at step S26, the routine jumps to a step S29.

At step S27, the return flag $F_{OFF}$ is set to 1 ($F_{OFF}$=1) and the return start opening angle θREL=0. Then, the routine goes to a step S28.

At step S28, controller 29 sets the threshold value dθSET of a depression return velocity by referring to a depression return velocity calculation map shown in FIG. 9 and vehicular velocity V of the vehicle.

Thereafter, the routine goes to a step S29.

FIG. 9 shows the calculation map of the accelerator depression releasing velocity threshold value of dθSET corresponding to the vehicular velocity V. This threshold value of dθSET is set to a value which can be predicted from the fact that the driver would transfer from the release of accelerator pedal 27 to the depression of brake pedal 23 according to a return velocity of accelerator pedal by the driver.

In details, for example, as shown in FIG. 9, the characteristic curve is set to have the constant maximum value dθmax when the vehicular velocity V falls in the low velocity region such as the city street run C1 (corresponds to about 40 Km/h or lower), to have the constant minimum value dθmin at the high velocity region such as the freeway run C3 (corresponds to about 80 Km/h or higher), and to have the linear interpolation value between the maximum and minimum values dθmin and dθmax at the middle velocity region C2.

At step S29, controller 29 determines if the return flag $F_{OFF}$ is set to 1 ($F_{OFF}$=1).

If $F_{OFF}$=1 (Yes) at step S29, the routine goes to a step S31.

If $F_{OFF}$=0 (No) at step S29, the routine goes to a step S30.

At step S31, controller 29 increments return counter $C_{REL}$ by one ($C_{REL}$=$C_{REL}$+1).

At the next step S32, controller 29 determines if the accelerator opening angle θ is narrower than a previously set return opening angle threshold value θCLEAR which enables to be deemed that the opening angle of accelerator pedal 27 is the release opening angle.

If θ<θCLEAR (Yes) at step S32, the routine goes to a step S33.

At step S33, controller 29 sets the return flag $F_{OFF}$ to zero ($F_{OFF}$=0) and the routine goes to a step S34.

At step S34, controller 29 calculates an accelerator pedal depression release velocity dθREL on a basis of the following equation (2). In the equation (2), dT denotes a control cycle of this control process in controller 29.

$$d\theta REL=(\theta REL-\theta CLEAR)/(C_{REL} \times dT) \quad (2).$$

At the next step S35, controller 29 determines if the calculated accelerator return velocity dθREL is equal to or higher than the accelerator return velocity threshold value dθSET If $d\theta REL \geq d\theta SET$ (Yes) at step S35, the routine goes to a step S36 in which the operation enable flag $F_{PBS}$ is set to 1 ($F_{PBS}=1$).

At the next step S37, controller 29 updates the present depression confirmation flag $F_{SET}(n)$ to the previous depression confirmation flag $F_{SET}(N-1)$ and the routine is returned to the operation determining process shown in FIG. 5.

On the other hand, if $\theta > \theta CLEAR$ (No) at step S32, the routine jumps to step S37.

Furthermore, if, at step S29, $F_{OFF} \neq 1$ (No), the routine goes to a step S30. At step S30, the return counter $C_{REL}$ is reset to 0 and the routine goes to step S37.

When the subroutine shown in FIG. 6 at step S14 in FIG. 5 is ended, the routine goes to a step S15 in FIG. 5.

At step S15, controller 29 determines if operation enable flag $F_{PBS}$ is set to 1 ($F_{PBS}=1$).

If $F_{PBS}=1$ (yes) at step S15, the routine goes to a step S16.

At step S16, controller 29 determines if a control operation flag Fc is set to 1 and the routine goes to a step S17.

At step S17, controller 29 determines if the preliminary brake pressure is released. For example, if any one of conditions such that brake pedal 23 has manipulated with the switch signal of brake switch 26 in on state to detect that brake pedal 23 has depressed, opening angle of the accelerator pedal 27 is in excess of the depression determining threshold value $\theta SET$ on the basis of accelerator opening angle $\theta$ from accelerator opening angle sensor 28, or the state wherein the preliminary brake pressure is developed on the basis of the measured value of time incremental value from a time point at which the development of the preliminary brake pressure is started and the measured time has continued equal to or longer than a predetermined time duration is established, controller 29 determines that it is necessary to release the development of the preliminary brake pressure.

If, at step S17, controller 29 determines that it is necessary to release the development of preliminary brake pressure (Yes), the routine goes to a step S19 in which the initialization is executed.

At step S19, control operation flag Fc is reset to 0, the return start opening angle $\theta_{REL}$ is reset to 0, return counter $C_{REL}$ is reset to 0, return flag $F_{OFF}$ is reset to 0, operation enabling flag FPBS is reset to 0.

Then, the routine returns to the control process routine shown in FIG. 3.

On the other hand, if, at step S17, controller 29 determines that it is not necessary to release the development of the preliminary brake pressure (No), the routine directly returns to the control process routine shown in FIG. 3.

In addition, if, at step S15, the operation flag FPBS is not 1 (FPBS$\neq$1) (No), the routine goes to step S19 described above.

It is noted that inter-vehicle distance sensor 31 corresponds to front object detector to detect the front object to be braked, step S12 in FIG. 5 corresponds to detector to detect the vehicular approaching state, the accelerator opening angle sensor 28 and step S14 in FIG. 5 correspond to acceleration/deceleration operation situation detector, steps S13 in FIG. 5 and S15 in FIG; 5 correspond to preliminary brake pressure start determinator, steps S8 through S10 in FIG. 3 correspond to brake pressure developing section, vehicular velocity detector 30 corresponds to vehicular velocity detector, and shift position sensor 36 correspond to shift position detector.

Next, an operation of the preview brake controlling apparatus in the first preferred embodiment will be described below.

Suppose that the vehicle has stopped with brake pedal 23 depressed.

In this state, in the control procedure in FIG. 3, the routine goes from step S1 to step S3. Since the vehicle has stopped and the vehicle velocity V is zero, at this time, the routine goes to step S3. At step S3, controller 29 reads the vehicular weight m detected by means of weight sensor 32. Then, at step S4, controller 29 sets the preliminary brake pressure to zero. At step S5, power supply to electromagnetic valve 5 is turned off since preliminary brake pressure Pst is zero. Although the preliminary brake pressure Pst is zero, the driver is depressing brake pedal 23, brake pressure is developed in accordance with depression variable of brake pedal 23 from master cylinder 25 so that the vehicle is maintained at stopped state.

Suppose that brake pedal 23 is released from the stopped state and the driver depresses accelerator pedal 27 to start the vehicle.

In this vehicular running state, when the preceding vehicle is not present or the inter-vehicle distance to the preceding vehicle is sufficient not to require the brake, the routine shown in FIG. 3 goes from step S1 to step S6 to execute preliminary brake pressure determining procedure shown in FIG. 5.

Then, controller 29 reads the vehicular velocity V and the inter-vehicle distance L(n) and calculates the vehicular velocity dV. Then, controller 29 calculates the determining distance L0 to determine whether the vehicle is approaching to the object in accordance with equation (1) on the basis of read values (steps S11 and S12).

At this time, since the preceding vehicle is not present or the inter-vehicle distance L to the preceding vehicle is sufficiently long, $L(n) \geq L0$ at step S13. Since the inter-vehicle distance is not approaching state, the routine goes to step S19 at which Fc=0.

Hence, returning to FIG. 3, since Fc=0 and it is not necessary to develop the preliminary brake pressure at step S7, the routine goes to step S4.

At step S4, preliminary brake pressure Pst is set to zero and no power supply to electromagnetic valve 5 is continued.

In this running state, suppose that the inter-vehicle distance L becomes shorter than the approaching distance L0 due to the follow up to a preceding vehicle whose velocity is shorter than the vehicular velocity V or the decelerating preceding vehicle. In the process shown in FIG. 5, the routine goes from step S13 to step S14 and the operation determining process is executed on the basis of operation situation of accelerator pedal 27.

In the operation determining process of FIG. 6, controller 29 sets depression determining threshold value $\theta SET$ from depression threshold value calculation map shown in FIG. 7 on the basis of vehicular velocity V and shift position of automatic transmission AT. Then, as shown at a time point t0 of FIG. 1A, if the accelerator pedal opening angle $\theta$ is narrower than depression determining threshold value $\theta SET$, the routine goes from step S22 to step S25. Then, as shown in FIG. 10B, depression flag $F_{SET}(n)$ is set to zero ($F_{SET}(n)=0$).

The, if depression flag $F_{SET}(n)$ is continued to zero, the routine goes from step S26 to step S29. At this time, since return flag $F_{OFF}$ is zero ($F_{OFF}=0$) (refer to FIG. 10B), the routine goes to step S30 at which $C_{REL}=0$ (refer to FIG. 10D).

Then, the present depression flag $F_{SET}(n)$ is updated to the previous depression flag $F_{SET}(n-1)$ and the routine returns to preliminary brake pressure determining process shown in FIG. 5.

At this time, since operation enabling flag FPBS is set to zero (FPBS=0), the routine goes from step S15 to step S19. Then, control operation flag Fc is set to zero (Fc=0).

Hence, the routine shown in FIG. 3 goes from step S7 to step S4 to set preliminary brake pressure Pst to zero and goes to step S5. Since Pst is already set to zero, no power supply to electromagnetic valve 5 is maintained.

From this state, when accelerator pedal 27 is further depressed deeply and opening angle θ of accelerator pedal: 27 is in excess of depression determining threshold value of θ SET at a time point of t1 shown in FIGS. 10A through 10D, the routine shown in FIG. 6 goes from step S22 to step S23 so that $F_{SET}(n)=1$ and goes to step S24 in which θREL=0, $C_{REL}=0$, $F_{OFF}=0$, and $F_{PBS}=0$.

Since $F_{SET}(N-1)=0$ and $F_{SET}(n)=1$, the routine goes from step S26 to steps S29 and S30 and goes to step S37 in which the present depression flag F(n) is updated as previous depression flag F(n−1) (F(n−1))=1). Hence, since operation enabling flag FPBS is maintained at zero, preliminary brake pressure Pst is set at zero and no power supply to electromagnetic valve 5 is maintained.

From this state, when the driver returns the depression state slowly to become lower than depression determining threshold value θSET at a time point t2, the routine goes from step S22 to step S25.

Since the routine goes from step S22 to step S25 depression flag $F_{SET}(n)$ is set to zero ($F_{SET}(n)=0$).

Since $F_{SET}(n-1)=1$ and $F_{SET}(n)=0$, the routine goes from step S26 to step S27 in which $F_{OFF}=0$ and the return start opening angle θREL is set to present accelerator opening angle θ (θREL=θ).

Then, at step S28, accelerator returning velocity threshold value dθSET is set from the vehicular velocity V of vehicular velocity sensor 30 and accelerator returning velocity threshold value dθSET is set from the vehicular velocity V of vehicular velocity sensor 30 and accelerator returning velocity threshold value dθSET of FIG. 9. This accelerator returning velocity threshold value dθSET is set to a relatively large value as the vehicular velocity V becomes slower. As the vehicular velocity V becomes higher, the threshold value of dθSET is set to a relatively small value.

Next, the routine goes to step S29. Since returning flag $F_{OFF}$ is set to 1 ($F_{OFF}=1$), the routine goes to step S31 at which the return counter $C_{REL}$ is incremented by one ($C_{REL}=C_{REL}+1$).

Since, at this time point, the opening angle θ of accelerator pedal 27 is wider than returning opening angle threshold value θCLEAR. Hence, the routine goes from step S332 to step S37 in which present depression flag $F_{SET}$ is maintained to be zero, the preliminary brake pressure Pst is set to be zero and no power supply to electromagnetic valve 5 is maintained at zero.

While acceleration opening angle θ is narrower than depression determining threshold value θSET and is wider than returning opening angle threshold value θCLEAR, the same processing as described above is repeated and, at step S31, returning counter $C_{REL}$ is incremented by one.

At a time point t3, if accelerator pedal opening angle θ becomes narrower than returning opening angle threshold value θCLEAR, the routine goes from step S32 to step S33.

At step S33, $F_{OFF}$ is set to zero ($F_{OFF}=0$).

At step S34, controller 29 calculates accelerator pedal depression returning velocity dθREL on the basis of equation (2).

In details, controller 29 calculates variation rate Δθ of accelerator pedal depression opening angle θ per time duration ΔT between time points t2 and t3.

Then, if accelerator returning velocity dθREL is in excess of accelerator returning velocity threshold value dθSET set on the basis of vehicular velocity V at step S28, namely, the velocity for the driver to return accelerator pedal 27 toward release position is accelerator pedal returning velocity threshold value dθSET, the routine goes from step S35 to step S36. At step S36, operation enabling flag FPBS is set to 1 (FPBS=1).

At step S37, present depression flag F(n) is updated as previous depression flag $F_{SET}(n-1)$.

Since operation enabling flag FPBS is set to 1 (FPBS=1), the routine goes from step S15 in FIG. 5 to step S16 at which operation control flag Fc is set to 1 (Fc=1).

At step S17, controller 29 determines if preliminary brake pressure Pst should be released.

For example, controller 29 determines whether the switch signal of brake switch 28 is turned off to indicate that brake pedal 23 is released, and/or accelerator opening angle θ is in excess of depression determining threshold value θSET.

If controller 29 determines that it is not necessary to release development of preliminary brake pressure, the routine goes from step S17 to step S7 shown in FIG. 3.

Since, at this time, Fc=1, the routine goes to step S8. Controller 29 then reads vehicular velocity V at which preliminary brake pressure Pst is started. The preliminary brake pressure Pst is set on the basis of vehicular weight m read when the vehicle stops and vehicular velocity V thereat.

Next, at step S10, controller 29 reads preliminary brake pressure Pb detected by brake pressure sensor 33 and controls a power supply to electromagnetic valve 5 so as to make the read brake pressure Pb coincide with the set preliminary brake pressure Pst.

Therefore, since vacuum valve 3 is closed due to the variation pressure chamber 1 of vacuum booster 24 and, on the contrary, atmospheric pressure valve 4 is opened, the atmospheric pressure valve 4 is opened, the atmospheric pressure is introduced into pressure variation chamber 1 of vacuum booster 24. Hence, the axial envelope 17 is moved in the leftward direction so that the push rod 8 is moved in the leftward direction. Hence, prior to the driver's brake manipulation, brake pressure in accordance with preliminary brake pressure Pst is developed to be braked.

At this time, the preliminary brake pressure Pst becomes smaller as the vehicular velocity V becomes lower and becomes larger as vehicular weight m becomes heavier. Therefore, preliminary brake pressure Pst becomes small in a case where the number of vehicular occupants and actually mounted matters are small and vehicular weight m is small at the low velocity region. Consequently, no unpleasant feeling is given to driver even though the vehicle falls in the brake state due to the brake pressure Pst so that the previous brake control predicting the brake manipulation by the driver can be achieved.

At this time, since preliminary brake pressure Pst is developed when the driver's depression state of accelerator pedal 27 and its returning velocity are in excess of their threshold values, preliminary brake pressure is acted upon the vehicle at the same time when the engine brake is acted upon the vehicle. Hence, even if the braking force due to preliminary brake pressure is acted upon the vehicle with the engine brake also acted upon the vehicle, the sudden application of brake to the vehicle body and unpleasant feeling are relieved caused by the action of braking force by the preliminary brake pressure Pst.

When in a state where the braking force in accordance with preliminary brake pressure Pst is developed, the driver depresses brake pedal 23 in place of accelerator pedal 23 in place of accelerator pedal 27. Since brake switch 26 detects the depression of brake pedal 23, the routine shown in FIG. 3 goes from step S1 to step S2. Since the vehicle is running and the vehicular velocity V is V>0, the routine goes to step S4.

Since preliminary brake pressure Pst is set to zero and no power supply to electromagnetic valve 5 is carried out, preliminary brake pressure actually developed in master cylinder 25 gives zero. In place of it, depression of brake pedal 23 causes brake pressure to be developed in accordance with the depression depth of brake pedal 23.

At this time, since preliminary brake pressure is developed before depression of brake pedal 23 by driver and brake pressure caused by the driver depression on brake pedal 23 is subsequently developed, the responsive characteristic of braking can be improved and shortening of the free running distance so as to shorten the brake distance can be achieved.

In addition, since, in the depression determining threshold value calculation map in FIG. 7, the depression determining threshold value θSET which is a criterion of whether the development of preliminary brake pressure should be started is set to be larger (wider) as the vehicular velocity V becomes low and the engine brake becomes smaller and as the shift position of automatic transmission AT becomes higher and engine brake becomes smaller. Hence, depression determining threshold value θSET is set in accordance with the magnitude of the engine brake actually developed. Consequently, a more accurate avoidance of unpleasant feeling to the driver can be achieved.

In addition, since depression determining threshold value θSET is set to be large in the low velocity region in which the engine brake cannot be expected and is set to develop the preliminary brake pressure when the vehicle is in such an acceleration state that a sufficient engine braking can be obtained, the same advantage as the high velocity can be achieved even when the vehicular velocity V is low.

Furthermore, in the accelerator returning velocity threshold value calculation map shown in FIG. 9, the accelerator returning velocity threshold value dθSET which is a criterion of determining whether the preliminary brake pressure development should be started is set to be smaller as the vehicular velocity V becomes higher.

Hence, although the vehicular brake distance is extended as the vehicular velocity V becomes increased, the preliminary brake pressure is developed at earlier stage in accordance with the accelerator returning velocity. Consequently, an effective development of preliminary brake pressure can be achieved and the vehicular brake distance can be shortened.

On the other hand, from a state where the braking force in accordance with preliminary brake pressure Pst is developed to a state where the driver depresses again the accelerator pedal 27 so that the opening angle θ is in excess of accelerator depression determining threshold value θSET, namely, the driver depresses again accelerator pedal 27 after the depression of accelerator pedal 27 is released, this is detected at step S17 in FIG. 5 and the routine goes from step S17 to step S19 in which the control operation flag Fc is set to zero. Hence, the routine shown in FIG. 3 goes from step S7 to step S4 so that the preliminary brake pressure Pst is set to zero to release the development of preliminary brake pressure Pst.

In the same manner as described above, when the state where the braking force in accordance with the preliminary brake pressure Pst is continued for a preset reference time duration or longer, namely, when the state where the depression of accelerator pedal 27 is released for the present reference time duration or longer, or when the depression of brake pedal 23 is not carried out, this is detected at step S17 shown in FIG. 5 and the routine goes from step S17 to step S19 so that control operation flag Fc is set to zero. At this time, the development of preliminary brake pressure is released. Hence, at a time point at which the transfer to the depression of brake pedal is not expected to be carried out, the preliminary brake pressure is released so that the unnecessary development of preliminary brake pressure Pst can be avoided.

The above-described reference time duration is, for example, approximately 1 second.

It is noted that, in the first embodiment, even if the inter-vehicle distance L(n) is shorter than approaching distance L0, preliminary brake pressure is not developed when, in the operation determining process, the accelerator opening angle θ is not in excess of depression determining threshold value θSET or accelerator returning velocity dθSET if the accelerator opening angle θ is in excess of depression determining threshold value θSET. The fact that accelerator returning velocity dθREL is not in excess of accelerator returning velocity threshold value dθSET means that a manner that returning accelerator pedal 27 is relatively moderate and can be deemed that an immediate transfer to the depression of brake pedal 23 does not occur. Hence, no problem occurs without development of preliminary brake pressure.

It is further noted that depression determining threshold value θSET is set in accordance with vehicular velocity V. When the vehicular velocity V is high, depression determining threshold value θSET is set to the relatively small (narrow) value. On the contrary, when the vehicular velocity V is low, the depression determining threshold value θSET is set to the relatively small value (narrow value). On the contrary, when the vehicular velocity V is low, depression determining threshold value θSET is set to the relatively large (wide) value.

If accelerator opening angle θ is not in excess of depression determining threshold value θSET, preliminary brake pressure is not developed. However, when the vehicular velocity V is relatively low, the vehicle can relatively quickly be stopped when the driver depresses brake pedal 23, When, in this case, accelerator opening angle θ is narrower than depression determining threshold value θSET under the relatively high vehicular velocity V, this means that the vehicle is not so accelerated. From this state, when accelerator pedal 27 is released, a relatively strong engine brake occurs so that the relatively sufficient braking force is secured. This case raises no, problem.

(Second Embodiment)

Next, a second preferred embodiment of the preview brake controlling apparatus according to the present invention will be described below.

Figure 11:
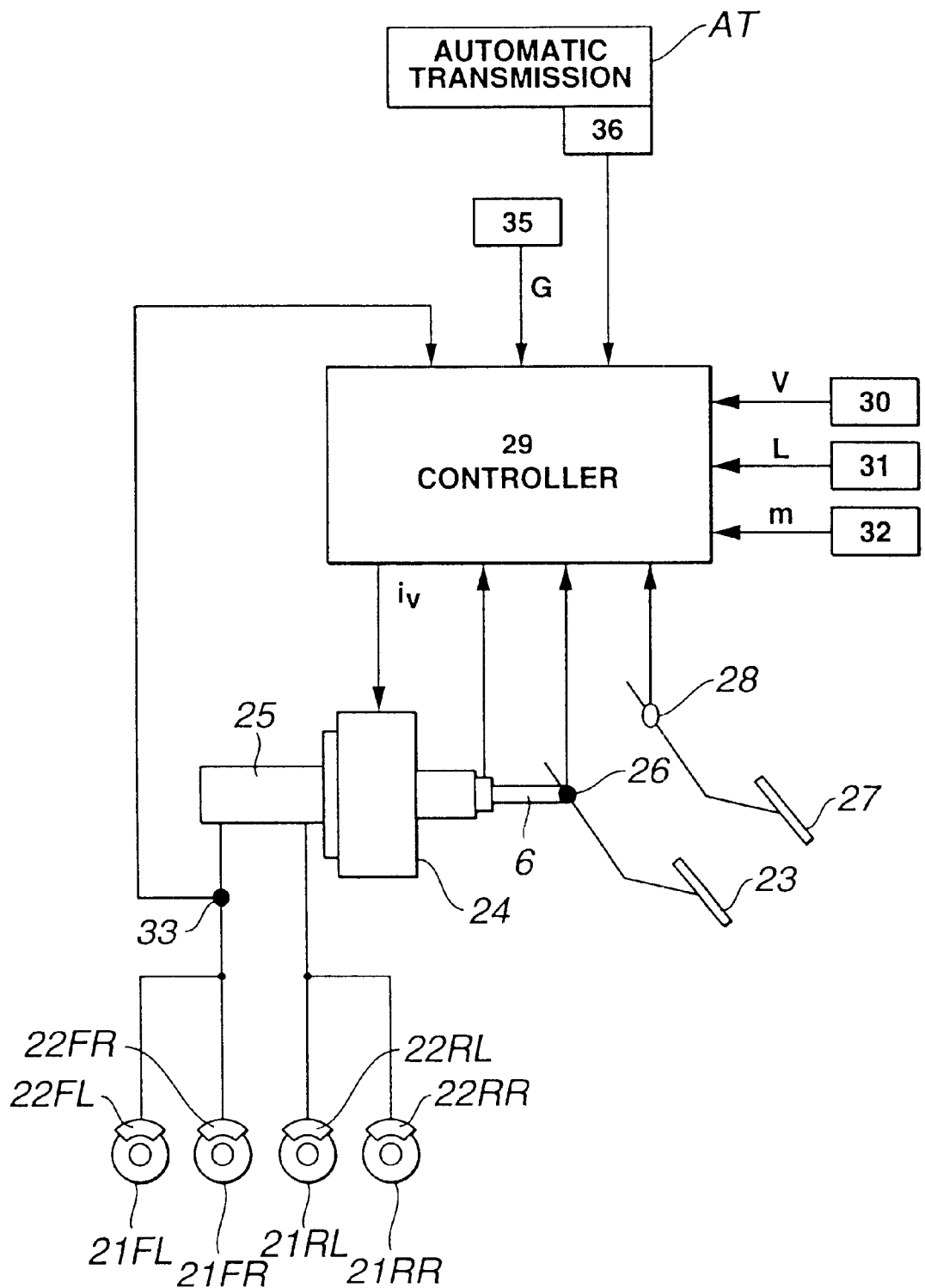
FIG. 11 is a system configuration view representing a second preferred embodiment of the preview brake controlling apparatus according to the present invention.

FIG. 11 shows a circuit block diagram of the preview brake controlling apparatus in the second embodiment.

As shown in FIG. 11, an acceleration sensor 35 to detect a vehicular acceleration acted upon the vehicle is added to the structure shown in FIG. 1A of the first embodiment.

The acceleration G detected by the acceleration sensor 35 is inputted to controller 29.

Controller 29 in the second embodiment executes the control procedure shown in FIG. 3 and preliminary brake pressure determining process shown in FIG. 5 in the same manner as described in the first embodiment.

Figure 12:
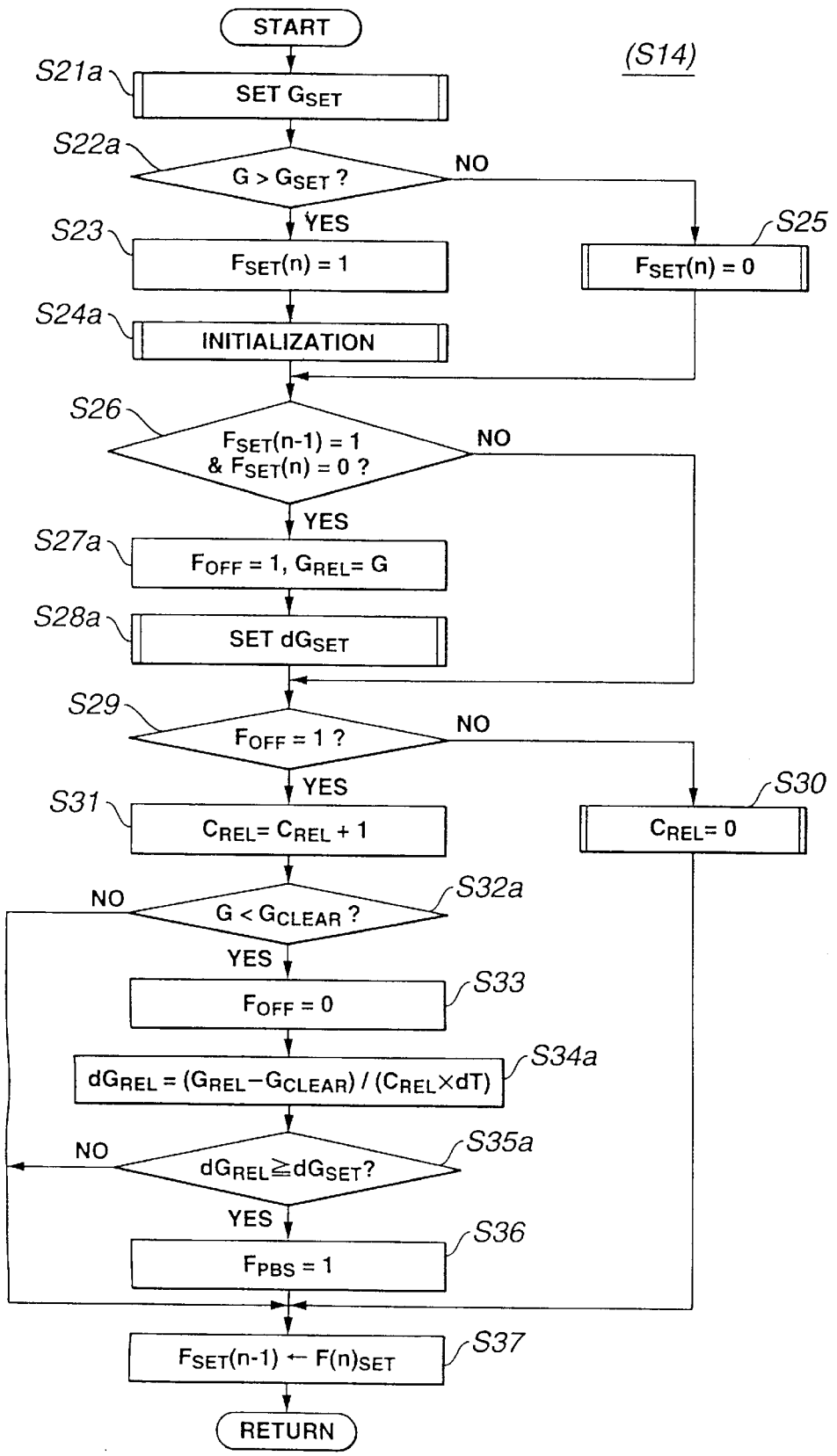
FIG. 12 is an operational flowchart representing one example of an operation determination procedure in the second preferred embodiment of the preview brake controlling apparatus according to the present invention shown in FIG. 11.

However, at operation determining process based on the manipulation of accelerator pedal 27 at step S14, another operation determining procedure shown in FIG. 12 is executed on a basis of acceleration G from acceleration sensor 35;. It is noted that since the same reference numerals designate corresponding like elements described in the first embodiment of FIG. 6, detailed explanation thereof will herein be omitted.

In details, at step S21a, controller 29 sets depression determining threshold value $G_{SET}$ to detect a development situation of vehicular acceleration.

Figure 13:
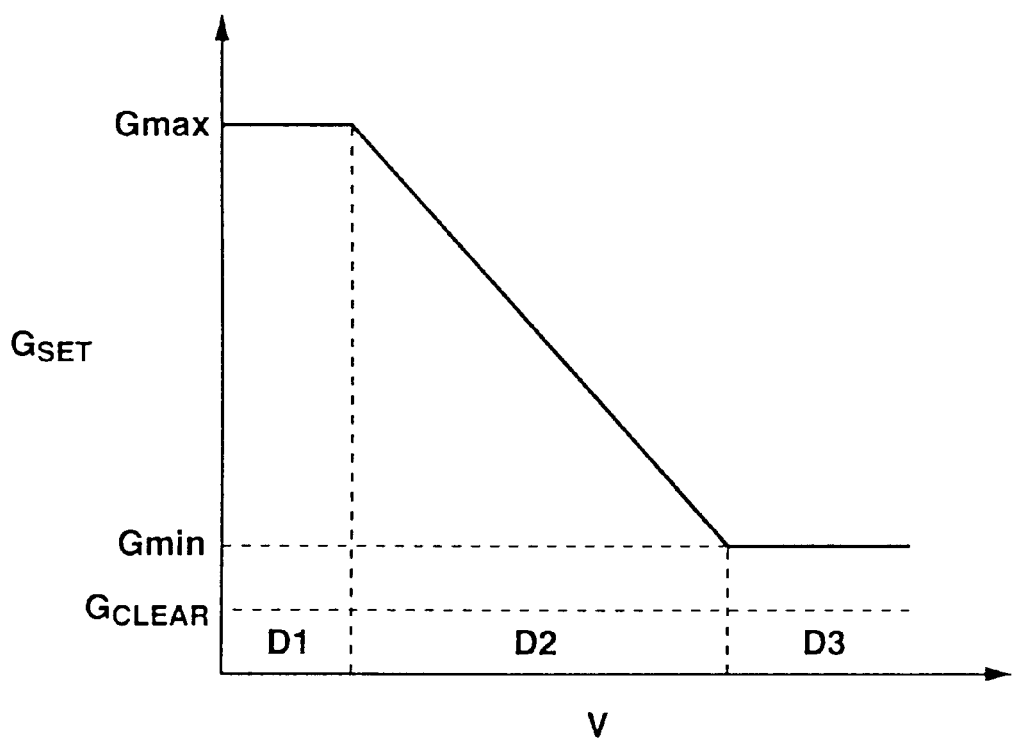
FIG. 13 is a characteristic graph representing the vehicular velocity and the threshold value of accelerator depression determination in the second preferred embodiment shown in FIG. 11.

This setting of depression determining threshold value $G_{SET}$ is carried out by, for example, referring to a calculation map of the depression determining threshold value shown in FIG. 13 on the basis of the vehicular velocity V detected by the vehicular velocity sensor 30.

FIG. 13 shows the depression determining calculation map representing a relationship between the vehicular velocity V and depression determining threshold value $G_{SET}$. The depression determining threshold value $G_{SET}$ is set to a value which can be deemed not to give the driver the sudden application of brake or unpleasant feeling even when the preliminary brake pressure is applied to some degree to the vehicle body in a case where the engine brake is acted upon the vehicle body with accelerator pedal 27 released from a state where the accelerator pedal 27 is depressed to develop an acceleration on the vehicle body, in the same way as the case of the depression determining threshold value θSET in the first embodiment, In details, as shown in FIG. 13, the characteristic curve is set to have the constant maximum value Gmax at the relatively low vehicular velocity region D1 which is equal to or below the city street running velocity (approximately 40 Km/h), to have the constant minimum value Gmin at the relatively high vehicular velocity region D3 which is equal to or higher than free-way vehicular running velocity (approximately 80 Km/h), and is set to take the linear interpolation value between maximum and minimum values Gmax and Gmin at the intermediate running velocity region D2.

If the depression determining threshold value GSET is set at step S21a, the routine shown in FIG. 12 goes to a step S22a.

At step S22a, controller 29 determines if the magnitude of acceleration G detected by the acceleration sensor 35 is larger than the depression determining threshold value $G_{SET}$.

If $G \leq G_{SET}$ (No), the routine goes to step S25.

At step S25, controller 29 sets present depression flag $F_{SET}(n)$ to zero ($F_{SET}(n)=0$) and the routine goes to step S26.

If previous depression flag $F_{SET}(n-1)$ is zero ($F_{SET}(n-1)=0$), the routine goes from step S26 to step S29 since present depression flag $F_{SET}(n)=0$.

At this time, return flag $F_{OFF}$ is zero ($F_{OFF}=0$), the routine goes to step S30 in which counter $C_{REL}$ is updated as $C_{REL}=0$ and the routine goes to step S37 in which present depression flag $F_{SET}(n)$ is updated as previous depression flag $F_{SET}(n-1)$. Then, the routine shown in FIG. 12 is ended and returns to the operation determining process in FIG. 5.

In this case, since operation enabling flag $F_{PBS}$ is $F_{PBS}=0$, preliminary brake pressure Pst is not developed.

From this case, if the acceleration G is increased and is in excess of the depression determining threshold value $G_{SET}$, the routine shown in FIG. 12 goes from step S22a to a step S23 in which depression flag $F_{SET}(n)$ is updated as $F_{SET}$ to 1. Then, at a step S24a, the initialization is carried out.

At step S24a, a return start acceleration $G_{REL}$ is zeroed ($G_{REL}=0$), return counter is zeroed ($C_{REL}=0$), return flag $F_{OFF}$ is zeroed ($F_{OFF}=0$), and operation enabling flag $F_{PBS}$ is zeroed.

Then, the routine goes to a step S26.

Since, at this time, previous depression flag $F_{SET}(n-1)$ is zeroed, the routine goes to step S29. Then, the routine goes to step S37 via step S30.

Thus, in this case, no preliminary brake pressure is developed.

From this state, the driver returns the depressed accelerator pedal 27 to decrease the acceleration G and the acceleration G is below the depression determining threshold value $G_{SET}$. At this time, the routine goes from step S22a to step S25 in which the depression flag $F_{SET}(n)$ is updated to zero. Since, at step S26, the previous depression flag $F_{SET}(n-1)$ is 1 and present depression flag $F_{SET}(n)$ is zero, the routine goes to a step S27a.

At step S27a, return flag $F_{OFF}$ is set to 1 ($F_{OFF}=1$) and return start acceleration $G_{REL}$ is set to G ($G_{REL}=G$) Then, the routine goes to a step S28a.

At step S28a, an acceleration variation rate threshold value $dG_{SET}$ is set from an acceleration variation rate threshold value calculation map and the vehicular velocity V of the vehicular velocity sensor 30.

The acceleration variation rate threshold value calculation map represents the relationship between the: vehicular velocity V and the acceleration variation rate: threshold value $dG_{SET}$.

The acceleration variation rate threshold value $dG_{SET}$ is generally the same as the accelerator returning velocity threshold value dθSET described in the first embodiment with reference to the accelerator returning velocity threshold value calculation map shown in FIG. 9 and is set to a value which can predict that the deriver releases the accelerator pedal 27 and depresses brake pedal 23.

The characteristic curve of the acceleration variation rate threshold value $dG_{SET}$ is set to have the constant maximum value Gmax at the low velocity region which is equal to or lower than the city street running vehicular velocity (approximately 40 Km/h), is set to have the constant minimum value Gmin at the high velocity region which is equal to or higher than the free-way running vehicular velocity (approximately 80 Km/h), and is set to have the linear interpolation value between the maximum and minimum values Gmax and Gmin at the middle vehicular velocity region.

Then, if, at step S28a, controller 29 sets the acceleration variation rate $dG_{SET}$, the routine goes to step S28a. Since return flag $F_{OFF}$ is 1 ($F_{OFF}=1$), the routine goes from step S29 to step S31 in which return counter $C_{REL}$ is incremented by one.

At step S32a, controller 29 determines if the acceleration G is smaller than a preset return opening angle threshold value $G_{CLEAR}$ by which the accelerator pedal 27 can be deemed to be released.

If G is smaller than $G_{CLEAR}$, viz., while the acceleration is such that the accelerator pedal cannot be deemed to be released, the routine goes from a step S32a to step S37. Hence, since operation enabling flag FPBS is maintained at zero ($F_{PBS}=0$), no preliminary pressure is developed.

Then, if the depressed accelerator pedal 27 is relieved and acceleration G becomes smaller than return; opening angle threshold value $G_{CLEAR}$, the controller 29 determines that accelerator pedal 27 has been released and the routine goes from step S32a to step S33.

After return flag $F_{OFF}$ is zeroed ($F_{OFF}=0$), the routine goes to a step S34a.

At step S34a, controller 29 calculates an. acceleration variation rate $dG_{REL}$ on the basis of the following equation (3).

$$dG_{REL}=(G_{REL}-G_{CLEAR})/(G_{REL} \times dT) \qquad (3).$$

At the next step S35a, controller 29 determines whether the acceleration variation rate dGREL is equal to or larger than acceleration variation rate threshold value: $dG_{REL}$ ($dG_{REL} \geq dG_{SET}$).

If $dG_{REL} \geq dG_{SET}$ (Yes) at step S35a, namely, if it is predicted that the variation rate of acceleration is so large that the driver releases accelerator pedal 27 and driver's driving is transferred to the depression of brake pedal 23, the routine goes to a step S36.

At step S36, operation enabling flag $F_{PBS}$ is set to 1 ($F_{PBS}=1$), the routine goes to step S37 in which present depression flag $F_{SET}(n)$ is updated as previous depression flag $F_{SET}(N-1)$ and the routine returns to operation. determining procedure shown in FIG. 5.

Since operation enabling flag $F_{PBS}$ is set to 1 ($F_{PBS}=1$), operation control flag Fc (Fc=1) at step S16 shown in FIG. 5 is set to 1 (Fc=1). Thus, at control procedure shown in FIG. 3, the routine goes from step S7 to step S8.

In the same manner as described above, preliminary brake pressure Pst is set on the basis of vehicular velocity V so that electromagnetic valve 5 is controlled to make brake pressure Pb coincident with preliminary brake pressure Pst.

On the other hand, if acceleration variation rate $dG_{REL}$ is smaller than acceleration variation rate threshold value $dG_{SET}$, namely, if it cannot be predicted that the driver depresses brake pedal 23, the routine goes directly from step S25a to step S37. Hence, since operation enabling flag $F_{PBS}$ maintains at zero ($F_{PBS}=0$), no development of preliminary brake pressure is carried out.

Hence, the same advantages as the first embodiment can be achieved in the second embodiment.

The acceleration sensor 35 is newly installed in the second embodiment to detect a vehicular acceleration. For example, variation rate in the vehicular velocity V is calculated and this may be used as vehicular acceleration G.

In each of the first and second embodiments, preliminary brake pressure Pst is set on the basis of vehicular velocity V and vehicular weight m. However, vehicular. deceleration may be detected and preliminary brake pressure Pst may be set on the basis of vehicular velocity V and vehicular weight m.

As vehicular weight m becomes larger, preliminary brake pressure Pst becomes larger. As vehicular deceleration becomes larger, preliminary brake pressure Pst may become smaller.

In addition, preliminary brake pressure Pst may be set to become smaller in accordance with smaller road surface friction coefficient while detecting road surface state.

In each of the first and second embodiments, accelerator opening angle sensor or acceleration sensor applied as acceleration/deceleration operation situation detector. For example, controller 29 may determine the required preliminary brake pressure state when the shift position of automatic transmission AT is transferred from an overdrive position to a shifted down position.

In each of the first and second preferred embodiments, brake operation situation is detected on the basis of the state of brake switch 26.

However, the brake operation situation may be detected from a stroke of brake pedal 23 or a start of brake operation may be detected when the brake pressure Pb detected by the brake pressure sensor 33 is equal to or higher than preliminary brake pressure Pst.

In each of the first and second embodiments, the preceding vehicle is detected by inter-vehicle distance sensor 31. However, even if an obstacle such as dropped obstacle on a road surface on which the vehicle is to run which is required for the driver to manipulate brake is detected, this may detect inter-vehicle distance sensor 31. In the same manner as described above, the preview brake control may be carried out.

In each of the first and second preferred embodiments, the calculation of relative velocity to the front obstacle is carried out. However, in a case where the inter-vehicle distance sensor which can also detect the relative velocity is applied, the detected relative velocity may directly be used.

In each of the first and second embodiments, the electromagnetic valve 5 is incorporated into vacuum booster 24 so that brake pressure Pb in accordance with preliminary brake pressure Pst is developed.

However, such a fluid pressure source as an oil pump may be disposed, a fluid pressure of this fluid pressure source is pressure controlled with a pressure control valve to develop a preliminary brake pressure Pst, and this pressure may be supplied to a brake actuator.

In each of the first and second preferred embodiments, master cylinder 25 is used to develop the brake pressure. However, an electric motor may be used as the brake actuator to develop the braking force. In this case, a drive current to the motor may be controlled on the basis of preliminary brake pressure Pst.

It is noted that the brake pre-pressure described in the drawings correspond to the preliminary brake pressure Pst.

The entire contents of Japanese Patent Applications No. 2000-043396 filed in Japan on Feb. 21, 2000 are herein incorporated by reference. Although the invention has been described above by reference to certain embodiment of the invention, the invention is not limited to the embodiments described above. Modifications and variations of the embodiments described above will occur to those skilled in the art in the light of the above teachings.

The scope of the invention is defined with reference to the following claims.

What is claimed is:

1. A preview brake controlling apparatus for an automotive vehicle, comprising:

an object detector to detect a relative distance of the vehicle to an object for the vehicle to be braked;

an approaching state detector to detect whether the vehicle is approaching to the object on the basis of the relative distance of the vehicle to the object;

a vehicular velocity variation rate manipulation situation detector to detect a manipulation situation on a vehicular velocity variation rate;

a preliminary brake pressure application start determining section that determines whether the vehicle falls in a preliminary brake pressure application enabled state requiring a preliminary brake pressure application on the basis of detection results by the approaching state detector and by the vehicular velocity variation rate manipulation situation detector; and a brake pressure generator to develop a brake pressure in accordance with a vehicular running condition prior to a vehicular driver's brake manipulation when the preliminary brake pressure application start determining section determines that the vehicle falls in the preliminary brake pressure application enabled state.

2. A preview brake controlling apparatus for an automotive vehicle as claimed in claim 1, wherein the preliminary brake pressure application state determining section determines that the vehicle falls in the preliminary brake pressure application enabled state when the approaching state detector detects that the vehicle is approaching to the object and when the vehicular velocity variation rate manipulation detector detects that such a deceleration manipulation as to exceed an accelerator release velocity threshold value is carried out.

3. A preview brake controlling apparatus for an automotive vehicle as claimed in claim 1, wherein the preliminary brake pressure application state determining section determines that the vehicle falls in the preliminary brake pressure application enabled state when the approaching state detector detects that the vehicle is approaching to the object and when the vehicular velocity variation rate manipulation situation detector detects that a deceleration manipulation is carried out from a state in which an accelerator manipulated variable detected by the vehicular velocity variation rate manipulation situation detector has exceeded an acceleration manipulated variable threshold value.

4. A preview brake controlling apparatus for an automotive vehicle as claimed in claim 1, wherein the preliminary brake pressure application state determining section determines that the vehicle falls in the preliminary brake pressure application enabled state when the approaching state detector detects that the vehicle is approaching to the object and when the vehicular velocity variation rate manipulation situation detector detects that a deceleration manipulation is carried out from a state in which an acceleration manipulated variable detected by the vehicular velocity variation rate manipulation situation detector has exceeded an acceleration manipulated variable threshold value and that a velocity of the deceleration manipulation has exceeded an accelerator release velocity threshold value.

5. A preview brake controlling apparatus for an automotive vehicle as claimed in claim 2, wherein the accelerator release velocity threshold value is set on the basis of a vehicular velocity of the vehicle and the preliminary brake pressure application start determining section comprises a vehicular velocity detector to detect a vehicular velocity of the vehicle, and the accelerator release velocity threshold value is set lower as the vehicular velocity becomes higher.

6. A preview brake controlling apparatus for an automotive vehicle as claimed in claim 3, wherein the acceleration manipulated variable threshold value is set on the basis of a vehicular velocity of the vehicle and the preliminary brake pressure application start determining section comprises a vehicular velocity detector to detect the vehicular velocity of the vehicle, and the acceleration manipulated variable threshold value is set smaller as the vehicular velocity becomes higher.

7. A preview brake controlling apparatus for an automotive vehicle as claimed in claim 3, wherein the acceleration manipulated variable threshold value is set on the basis of a vehicular velocity of the vehicle and the preliminary brake pressure application start determining section comprises a shift position detector to detect a shift position of a transmission of the vehicle, and the acceleration manipulated variable threshold value is set smaller as the shift position of the transmission becomes a lower speed range.

8. A preview brake controlling apparatus for an automotive vehicle as claimed in claim 1, wherein the vehicular velocity variation rate manipulation situation detector comprises a detector to detect a manipulated variable of an accelerator pedal.

9. A preview brake controlling apparatus for an automotive vehicle as claimed in claim 1, wherein the vehicular velocity variation rate manipulation situation detector comprises a detector to detect a longitudinal acceleration of the vehicle.

10. A preview brake controlling apparatus for an automotive vehicle as claimed in claim 1, wherein the vehicular velocity variation rate manipulation situation detector comprises a detector to detect a shift position of a transmission of the vehicle.

11. A preview brake controlling apparatus for an automotive vehicle as claimed in claim 1, wherein the preliminary brake pressure application start determining section comprises a vehicular velocity detector to detect a vehicular velocity of the vehicle and the brake pressure generator determines the preliminary brake pressure from a characteristic table in accordance with the vehicular velocity of the vehicle at which the application of the preliminary brake pressure is started and a vehicular weight which is measured when the vehicle stops.

12. A preview brake controlling apparatus for an automotive vehicle as claimed in claim 1, wherein the brake pressure generator generates the preliminary brake pressure as a predetermined constant preliminary brake pressure for a reference time duration.

13. A preview brake controlling apparatus for an automotive vehicle as claimed in claim 1, wherein the brake pressure generator releases the development of the preliminary brake pressure when an acceleration manipulated variable detected by the vehicular velocity variation rate manipulation situation detector has exceeded an acceleration manipulated variable threshold value during the development of the preliminary brake pressure.

14. A preview brake controlling apparatus for an automotive vehicle as claimed in claim 11, wherein the preliminary brake pressure is set to become larger as the vehicular velocity of the vehicle (V0) at which the application of the preliminary brake pressure is started becomes higher and to become larger as the vehicular weight becomes heavier.

15. A preview brake controlling apparatus for an automotive vehicle as claimed in claim 1, wherein the approaching state detector detects whether the vehicle is approaching to the object on the basis of whether the relative distance (L) of the vehicle to the object is shorter than an approaching distance (L0) based on a relative velocity of the vehicle to the object and a differential value (dV) of an inter-vehicle distance from the vehicle to the object.

16. A preview brake controlling apparatus for an automotive vehicle as claimed in claim 1, wherein the preliminary brake pressure application start determining section comprises: an opening angle sensor to detect an opening angle of an accelerator pedal; a deceleration manipulation velocity calculator to calculate an accelerator pedal returning velocity (dθREL) on the basis of an accelerator pedal release start opening angle (θREL), an accelerator pedal opening angle threshold value (θCLEAR) enabling for the accelerator pedal to be deemed to be released, and a time duration for the vehicular driver to release from the accelerator pedal; and a comparator to determine whether the calculated accelerator pedal returning velocity (dθREL) is equal to or larger than a release velocity threshold value (dθSET); and a control operation flag (Fc) representing that the preliminary brake pressure application is enabled and set when the accelerator pedal returning velocity is equal to or larger than the release velocity threshold value.

17. A preview brake controlling apparatus for an automotive vehicle as claimed in claim 9, wherein the preliminary brake pressure application start determining section comprises: an opening angle sensor to detect an opening angle of an accelerator pedal and an acceleration variation rate calculator to calculate an acceleration variation rate (dGREL) on the basis of an accelerator pedal release start acceleration (GREL), an accelerator pedal opening angle threshold value (GCLEAR) enabling for the accelerator pedal to be deemed to be released, and a time duration for the vehicular driver to release from the accelerator pedal; and a comparator to determine whether the calculated acceleration variation rate (dGREL) is equal to or larger than an acceleration variation rate threshold value (dGSET); and a control operation flag representing that the preliminary brake pressure application is enabled and set when the acceleration variation rate is equal to or larger than the acceleration variation rate threshold value.

18. A preview brake controlling method for an automotive vehicle, comprising:

detecting a relative distance of the vehicle to an object for the vehicle to be braked;

detecting whether the vehicle is approaching to the object on the basis of the relative distance of the vehicle to the object;

detecting a vehicular velocity variation rate manipulation situation;

determining whether the vehicle falls in a preliminary brake pressure application enabled state requiring a preliminary brake pressure application on the basis of detection results at the steps of the approaching state detecting and of the vehicular velocity variation rate manipulation situation; and developing a predetermined constant brake pressure in accordance with a vehicular running condition prior to a vehicular diver's brake manipulation when determining that the vehicle falls in the preliminary brake pressure application enabled state.

19. A preview brake controlling apparatus for an automotive vehicle, comprising:

object detecting means for detecting a relative distance of the vehicle to an object for the vehicle to be braked;

approaching state detecting means for detecting whether the vehicle is approaching to the object on the basis of the relative distance of the vehicle to the object; vehicular velocity variation rate manipulation situation detecting means for detecting a manipulation situation on a vehicular velocity variation rate;

preliminary brake pressure application start determining means or determining whether the vehicle falls in a preliminary brake pressure application enabled state requiring a preliminary brake pressure application on the basis of detection results by the approaching state detecting means and by the vehicular velocity variation rate manipulation situation detecting means; and brake pressure generating means for developing a preliminary brake pressure in accordance with a vehicular running condition prior to a vehicular driver's brake manipulation when the preliminary brake pressure application start determining means determines that the vehicle falls in the preliminary brake pressure application enabled state.

\* \* \* \* \*